(12) United States Patent
Koide

(10) Patent No.: US 7,079,696 B2
(45) Date of Patent: Jul. 18, 2006

(54) IMAGE ENCODING APPARATUS AND METHOD, IMAGE DISPLAY APPARATUS AND METHOD, IMAGE PROCESSING SYSTEM AND IMAGE SENSING APPARATUS

(75) Inventor: Yuji Koide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 10/327,184

(22) Filed: Dec. 24, 2002

(65) Prior Publication Data
US 2003/0099404 A1    May 29, 2003

Related U.S. Application Data

(63) Continuation of application No. PCT/JP01/06278, filed on Jul. 19, 2001.

(30) Foreign Application Priority Data
Jul. 24, 2000  (JP)  ............................. 2000-222812

(51) Int. Cl.
*G06K 9/36*  (2006.01)

(52) U.S. Cl. ..................................... 382/240

(58) Field of Classification Search ................ 382/232, 382/236, 238, 240, 242, 248, 250; 348/384.1, 348/394.1, 395.1, 400.1–404.1, 407.1–416.1, 348/420.1–421.1, 425.2, 430.1–431.1; 375/240.02–240.03, 375/240.11–240.16, 240.18–240.2, 240.22–240.25; 341/51, 63, 65, 67, 79, 107; 345/420; 707/101; 708/203, 300, 307–308, 313, 316–317, 400–405
See application file for complete search history.

(56) References Cited

U.S. PATENT DOCUMENTS 5,694,484 A * 12/1997 Cottrell et al. .............. 382/167

5,768,446 A * 6/1998 Reasoner et al. ........... 382/304

(Continued)

FOREIGN PATENT DOCUMENTS

| JP | 08-214308   | 8/1996 |
| JP | 10-229560   | 8/1998 |
| JP | 2000-13593 A | 1/2000 |
| JP | 2000-23157 A | 1/2000 |
| JP | 2000-138934 | 5/2000 |
| JP | 2000-152170 | 5/2000 |

OTHER PUBLICATIONS

Ikuro Ueno, Standardization Status of The New ISO Standard JPEG-2000. The Journal of The Institute of Image Information and Television Engineers (Eizou Jouhou Media Gakkai Shi), Dec. 1998, vol. 52, No. 12, pp. 1779-1884.

*Primary Examiner*—Jose L. Couso
(74) *Attorney, Agent, or Firm*—Fitzpatrick, Cella, Harper & Scinto

(57) ABSTRACT

Disclosed are an image encoding apparatus and method for generating an image file in which it is possible to check the content of an image, which has been compressively encoded using a wavelet transform, not only in an apparatus that is capable of expanding compressed image data compressively encoded using a wavelet transform but also in an apparatus that is capable of expanding compressed image data compressively encoded using a discrete cosine transform (DCT) but incapable of expanding image data compressively encoded using a wavelet transform. The image encoding apparatus has a first compressing encoder 2 for performing compressing encoding using a wavelet transform and a second compressing encoder for performing compressing encoding using a discrete cosine transform. First and second compressed image data resulting from this encoding is gathered in a single image file in a file creation unit 4. By analyzing the image file using a file analyzer 6, even an apparatus having only expansion means that uses DCT can check the content of an image if the apparatus expands the second compressed image data.

23 Claims, 5 Drawing Sheets

U.S. PATENT DOCUMENTS 5,838,823 A * 11/1998 Ancessi ...................... 382/232
5,987,459 A * 11/1999 Swanson et al. ............... 707/6
6,332,030 B1 * 12/2001 Manjunath et al. ......... 382/100
6,470,469 B1 * 10/2002 Chou et al. ................. 714/746
6,476,805 B1 * 11/2002 Shum et al. ................ 345/420

* cited by examiner

IMAGE ENCODING APPARATUS AND METHOD, IMAGE DISPLAY APPARATUS AND METHOD, IMAGE PROCESSING SYSTEM AND IMAGE SENSING APPARATUS

This application is a continuation of International Application No. PCT/JP01/06278, filed Jul. 19, 2001, and published on Jan. 31, 2002 in the English language as International Publication No. WO 02/09440 A1, and claims benefit of Japanese Appln. No. 2000-222812, filed on Jul. 24, 2000.

TECHNICAL FIELD

This invention relates to an image encoding apparatus for encoding image data to create a file in which the amount of image data has been compressed, and to an image display apparatus for expanding and displaying the image data that has been encoded and compressed.

BACKGROUND ART

The JPEG scheme recommended by the ISO and ITU-T is being widely used as a method of compressively encoding images captured in digital cameras and the like. In accordance with the JPEG scheme, encoding is carried out using a discrete cosine transform.

At present, JPEG 2000 is being studied as a next-generation compression scheme. Though the details relating to JPEG 2000 are not described here, a feature of this scheme is that a discrete wavelet transform is used instead of the discrete cosine transform.

However, a problem with encoding using a wavelet transform is that the time needed for compression (encoding) and expansion (decoding) is greater than that with encoding using the discrete cosine transform. A further problem is that an apparatus not having means for expanding image data that has been compressively encoded using a wavelet transform is incapable of displaying an image that has been compressively encoded using the wavelet transform.

DISCLOSURE OF THE INVENTION

The present invention has been devised to solve the foregoing problems of the prior art and a first object thereof is to provide an image encoding apparatus and method for generating an image file in which it is possible to check the content of an image, which has been compressively encoded using a wavelet transform, not only in an apparatus that is capable of expanding compressed image data compressively encoded using the wavelet transform but also in an apparatus that is capable of expanding compressed image data compressively encoded using a discrete cosine transform but incapable of expanding image data compressively encoded using a wavelet transform.

Another object of the present invention is to provide an image display apparatus and method that make it possible to display compressed image data, which has been compressively encoded using a discrete cosine transform, from an image file containing compressed image data that has been compressively encoded using a discrete cosine transform and compressed image data that has been compressively encoded using another encoding compression format.

A further object of the present invention is to provide an image processing system and image sensing apparatus which use the image encoding apparatus and/or image display apparatus according to the present invention.

Specifically, the gist of the present invention is an image encoding apparatus for generating an image file having compressed image data obtained by compressively encoding image data, wherein the apparatus is characterized by comprising first encoding means for compressively encoding input image data by a compressing encoding method that uses a wavelet transform, and outputting the result as first compressed image data; second encoding means for compressively encoding input image data by a compressing encoding method that uses a discrete cosine transform, and outputting the result as second compressed image data; and image file generating means for generating the single image file, representing said input image data, by using said first and second compressed image data and information relating to said first and second compressed image data.

Further, the gist of the present invention according to another aspect is an image display apparatus characterized by comprising: extraction means for extracting compressed image data, which has been compressively encoded by a compressing encoding method using a discrete cosine transform, from an image file containing plural items of compressed image data encoded by compressing encoding methods that differ from one another; expansion means for expanding the extracted compressively encoded image data using an inverse discrete cosine transform; display-image generating means for generating image display for display by using image data obtained as a result of expansion; and display means for displaying the image data for display.

Further, the gist of the present invention according to another aspect is an image processing system characterized by comprising an image encoding apparatus of the present invention and an image display apparatus of the present invention.

Further, the gist of the present invention according to another aspect is an image sensing apparatus having an image encoding apparatus and/or image display apparatus according to the present invention.

Further, the gist of the present invention according to another aspect is an image encoding method for generating an image file having compressed image data obtained by compressively encoding image data, wherein the method is characterized by comprising steps of: a first encoding step of compressively encoding input image data by a compressing encoding method that uses a wavelet transform, and outputting the result as first compressed image data; a second encoding step of compressively encoding input image data by a compressing encoding method that uses a discrete cosine transform, and outputting the result as second compressed image data; and an image file generating step of generating the single image file, representing said input image data, by using said first and second compressed image data and information relating to said first and second compressed image data.

Further, the gist of the present invention according to another aspect is an image display method comprising steps of: an extraction step of extracting compressed image data, which has been compressively encoded by a compressing encoding method using a discrete cosine transform, from an image file containing plural items of compressed image data encoded by compressing encoding methods that differ from one another; an expansion step of expanding the extracted compressively encoded image data using an inverse discrete cosine transform; a display-image generating step of generating image display for display by using image data obtained as a result of expansion; and a display step of displaying the image data for display.

Further, the gist of the present invention according to another aspect is a computer-readable storage medium storing an image encoding program for generating an image file having compressed image data obtained by compressively encoding image data, characterized in that the program has program code of a first encoding step of compressively encoding input image data by a compressing encoding method that uses a wavelet transform, and outputting the result as first compressed image data; program code of a second encoding step of compressively encoding input image data by a compressing encoding method that uses a discrete cosine transform, and outputting the result as second compressed image data; and program code of an image file generating step of generating the single image file, representing said input image data, by using said first and second compressed image data and information relating to said first and second compressed image data.

Further, the gist of the present invention according to another aspect is a computer-readable storage medium characterized by storing a program of an image display method having program code of an extraction step of extracting compressed image data, which has been compressively encoded by a compressing encoding method using a discrete cosine transform, from an image file containing plural items of compressed image data encoded by compressing encoding methods that differ from one another; program code of an expansion step of expanding the extracted compressively encoded image data using an inverse discrete cosine transform; program code of a display-image generating step of generating image display for display by using image data obtained as a result of expansion; and program code of a display step of displaying the image data for display.

BEST MODE FOR CARRYING OUT THE INVENTION

The present invention will now be described on the basis of a preferred embodiment thereof with reference to the drawings. In the description that follows, in order to facilitate an understanding of the present invention, an image processing system having an image encoding apparatus according to an embodiment of the present invention and an image display apparatus according to the embodiment of the present invention will be described, then a digital camera will be described as an example of an image sensing apparatus using the image encoding apparatus and image display apparatus according to the embodiment of the present invention. However, it goes without saying that it is possible to use the image encoding apparatus and image display apparatus separately and independently of each other.

Figure 1:
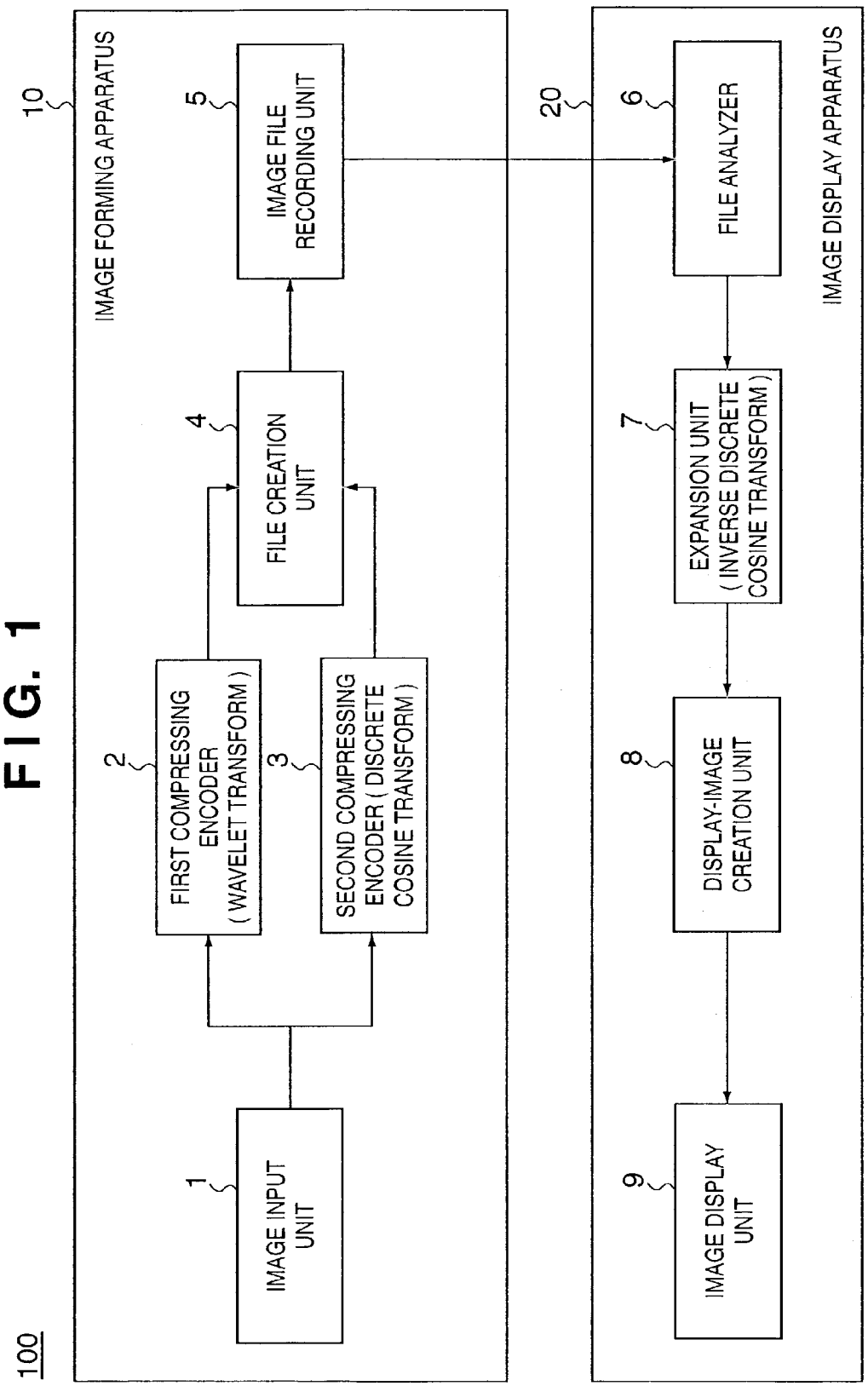
FIG. 1 is a block diagram illustrating an example of the structure of an image processing system comprising an image encoding apparatus and an image display apparatus according to an embodiment of the present invention.

FIG. 1 is a block diagram illustrating an example of the structure of an image processing system comprising an image encoding apparatus and an image display apparatus according to an embodiment of the present invention.

In FIG. 1, an image processing system 100 has an image encoding apparatus 10 and an image display apparatus 20, and the arrangement is such that an image file created by the image encoding apparatus 10 is displayed by the image display apparatus 20. The image encoding apparatus 10 and image display apparatus 20 may be connected directly by a cable or the like or remotely via a communication line or the like.

In the image encoding apparatus 10, numeral 1 denotes an image input unit for inputting an image (image data) that is to undergo compressing encoding. The image input unit may be an image sensing apparatus or image sensing circuit of a digital camera or the like having an image sensing device, or an apparatus or circuit of an image scanner or the like for outputting image data having a format capable of being handled by compressing encoding means of a latter stage, or an apparatus which receives image data from the outside via a network or the like.

Numeral 2 denotes a first compressing encoder for creating compressed image data by subjecting image data to encoding implemented using a wavelet transform; 3 a second compressing encoder for creating compressed image data by subjecting image data to encoding implemented using a discrete cosine transform; 4 a file creation unit for uniting more than one item of image data created by the first and second compressing encoders 2, 3, and for creating header information to thereby create one image file (united-image file); and 5 a file recording unit for recording the united-image file, which has been created by the file creation unit 4, in a prescribed recording device or recording medium.

In the image display apparatus 20, numeral 6 denotes a file analyzer for reading the united-image file out of the file recording unit 5 and extracting compressed image data, which has undergone compressing encoding using the second compressing encoder, i.e., the discrete cosine transform, from the united-image file that has been read out; 7 an expansion unit, which uses an inverse discrete cosine transform, for expanding the compressed image data extracted by the file analyzer 6; 8 a display-image creation unit which creates an image for display from the image data expanded by the expansion unit 7; and 9 an image display unit for displaying the display image created by the display-image creation unit 8.

It should be noted that in this embodiment, the expansion unit 7 in the image display apparatus 20 has been adapted so as to be capable of executing processing necessary for the expansion (decoding) not only of the portion based upon the discrete cosine transform but also image data that has been encoded by the second compressing encoder 3.

The image encoding apparatus 10 and image display apparatus 20 operate, together or independently of each other, under the control of a controller such as a CPU.

Figure 2:
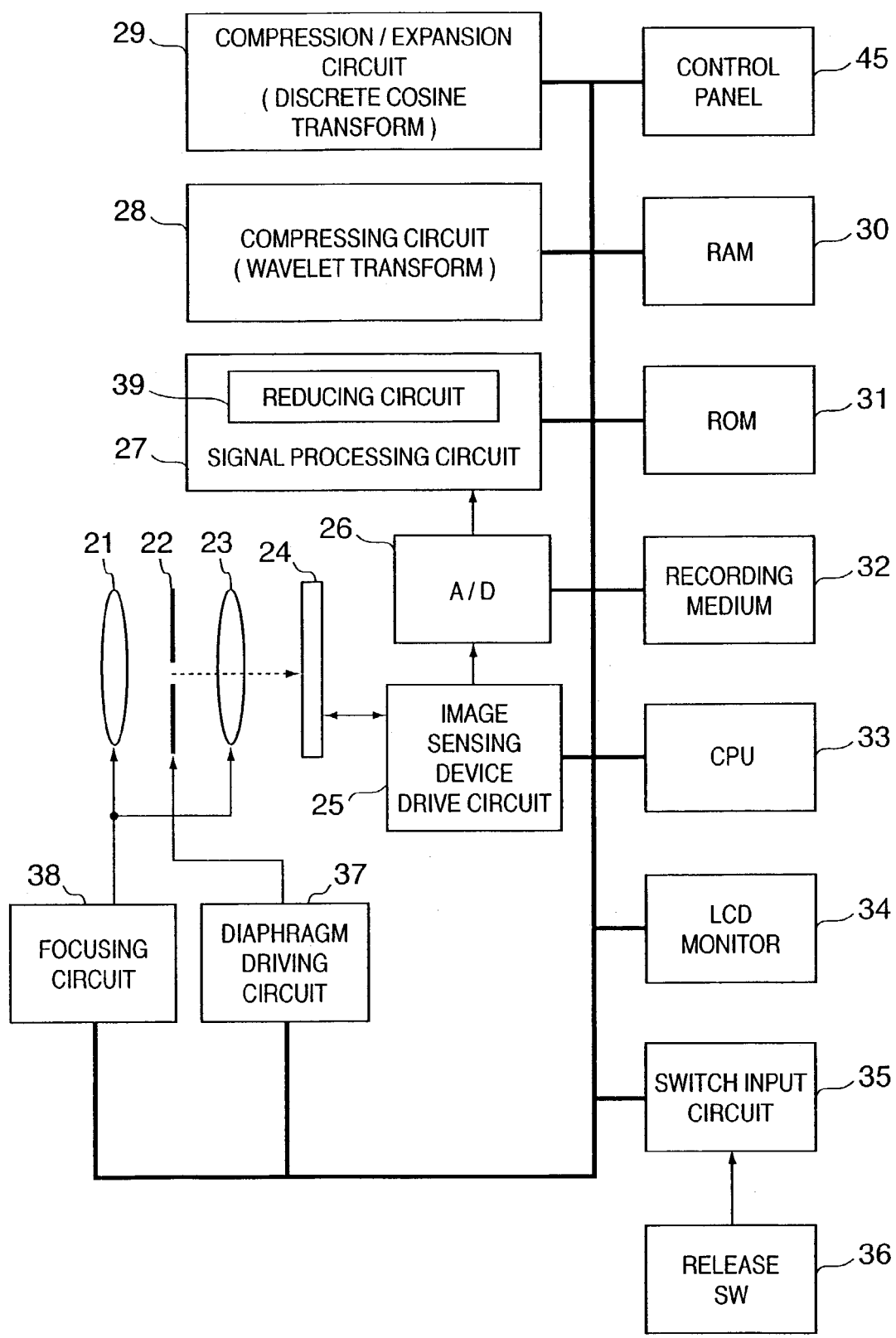
FIG. 2 is a block diagram illustrating an example of the structure of a digital camera to which the image encoding apparatus and image display apparatus of this embodiment of the present invention are applied.

FIG. 2 is a block diagram illustrating an example of an arrangement in a case where the image processing system shown in FIG. 1 is applied to a digital camera.

In FIG. 2, numerals 21, 23 denote taking lenses which, for the sake of convenience, are illustrated by two lenses. In actuality, however, the taking lenses are composed of a number of lenses. Numeral 22 denotes a diaphragm for adjusting the amount of light from the taking lenses. Numeral 24 denotes a CCD- or CMOS-type image sensing device.

Numeral 38 denotes a focusing circuit placed within the taking lenses; 37 a diaphragm driving circuit placed within the taking lenses; 25 a driving circuit for the image sensing device; 26 an A/D converter for the photographic signal output from the image sensing device; and 27 a signal processing circuit for applying signal processing to the digitally converted photographic signal. A reducing circuit 29 for reducing an image is included in the signal processing circuit 27. Numeral 36 denotes a release switch. Numeral 35 denotes a switch input circuit for sensing the release switch or a switch dial or the like such as a mode dial (not shown in this drawing) for changing over the mode of photography. With the exception of the reducing circuit 39, these structural elements correspond to image input unit 1 of FIG. 1.

Numeral 28 denotes a compressing encoder circuit, which corresponds to the first compressing encoder 2 in FIG. 1, for subjecting a digital image signal that has undergone signal processing to compressing encoding using a wavelet transform. Numeral 29 denotes a compression/expansion circuit, which corresponds to the second compressing encoder 3 and expansion unit 7 in FIG. 1, for subjecting a digital image signal that has undergone signal processing to compressing encoding using a discrete cosine transform, in a manner similar to that of the compression circuit 29, and for expanding a compressed image that has undergone compressing encoding using a discrete cosine transform.

Numeral 30 denotes a RAM for temporarily retaining a digital image signal or the like; 31 a ROM in which a program or the like executed by the CPU 33 has been stored; 32 a recording medium (CF) such as a compact flash memory for recording a captured image; 33 the CPU, which controls the overall digital camera; and 34 a liquid crystal monitor, which corresponds to the image display unit of FIG. 1, for reading out and displaying a digital image signal that has been recorded on the recording medium.

The recording medium 32 may be removable or fixed or may have both a removable recording medium and a fixed storage medium. Furthermore, the recording medium may have an interface circuit for making a connection to an external device such as a computer.

A control panel 45, which is composed of a touch-sensitive panel provided on the liquid crystal monitor 34 and buttons and keys provided on the case of the digital camera, is used when the user operates and sets the digital camera in various ways.

Further, in the digital camera shown in FIG. 2, the processing executed by the file creation unit 4, image file recording unit 5, file analyzer 6 and display-image creation unit 8 in FIG. 1 is implemented by having the CPU 33 run the program that has been stored in the ROM 31.

[Image Formation (Encoding) Processing]

Figure 3:
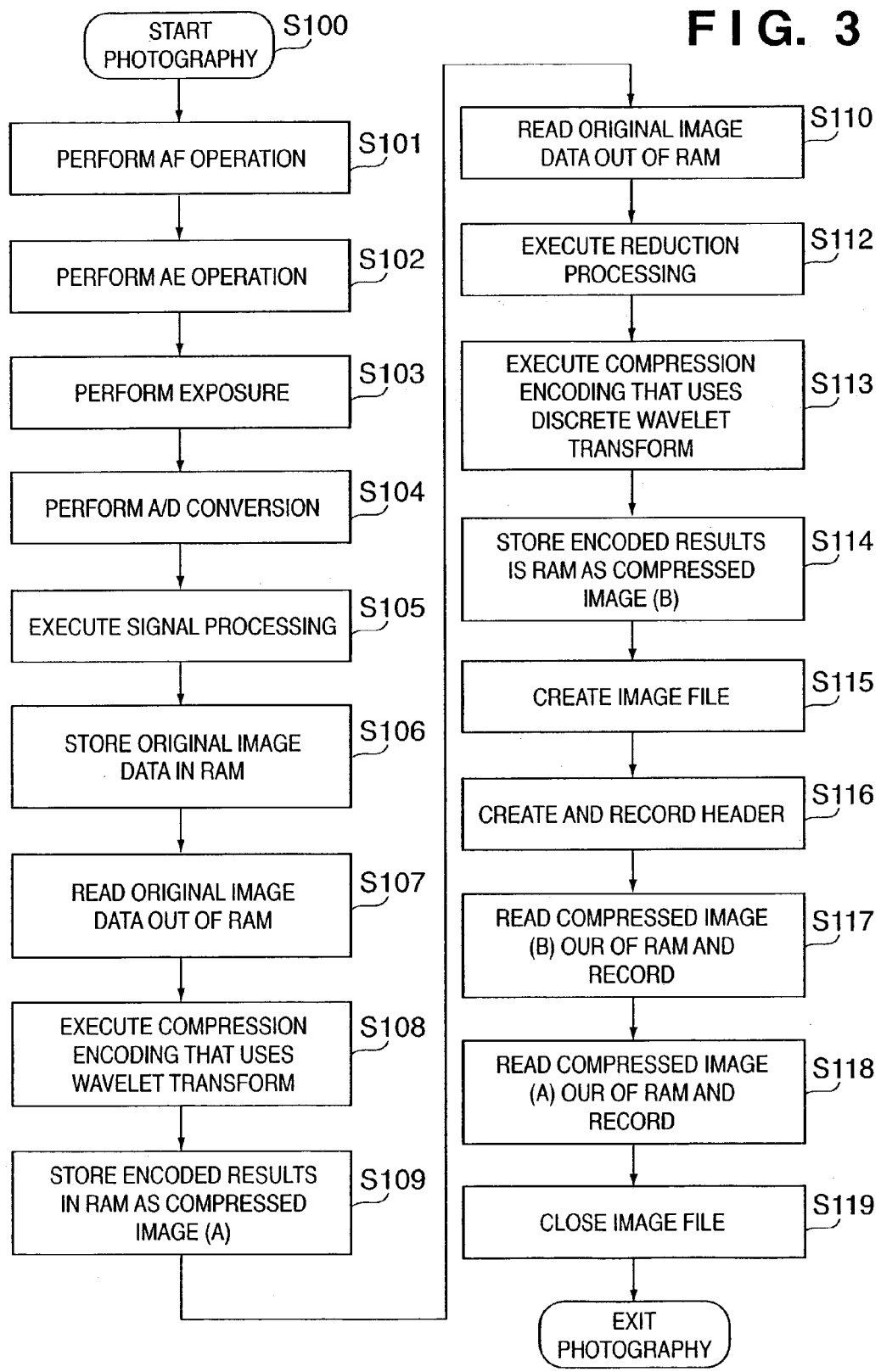
FIG. 3 is a flowchart useful in describing photography processing in the digital camera of FIG. 2.

FIG. 3 is a flowchart for when photography is performed by a digital camera to which the present invention is applied.

First, the digital camera starts photography in response to the release switch 36 being placed in the ON state by the user (step S100). Next, an AF operation is performed at step S101 and an AE operation is performed at step S102. The AF and AE operations read an electric-charge signal output of the image sensing device 24 and successively read sensed-image signals into the signal processing circuit 27 via the A/D converter 26. The signal processing circuit 27 performs a calculation based upon the sensed-image signals that have been successively read in, and the CPU 33 controls the focusing circuit 38 and diaphragm driving circuit 37 using the results of calculation, thereby changing the positions of the lenses 21, 22 and varying the size of the diaphragm 22 to perform focusing.

Next, at step S103, exposure for photography is carried out by the image sensing device 24, then, at step S104, electric charge that has accumulated in the image sensing device 24 by exposure is read out and the sensed-image signal, which is the output signal of the image sensing device 24, is subjected to an A/D conversion by the A/D converter 26 at step S104. This digitally converted signal is subjected to image processing in the signal processing circuit 27 at step S105 and is retained temporarily in the RAM 30 as digital image data (original image data) at step S106.

Next, in order to apply compressing encoding (assumed to be the JPEG 2000 scheme, by way of example) to the original image data using a wavelet transform, the original image data that was retained temporarily in the RAM 30 is read out at step S107 and is subjected to compressing encoding processing in accordance with JPEG 2000 at step S108 using the compression circuit 28. The image data that has undergone compressing encoding processing is then temporarily retained in the RAM 30 again as a compressed image (A) (step S109).

This embodiment generates a thumbnail image, which is obtained by reducing the size of the original image data to undergo compressing encoding using a wavelet transform, and subjects this thumbnail image to compressing encoding (assumed to be the JPEG scheme, by way of example) using a discrete cosine transform.

More specifically, the original image data retained temporarily in RAM 30 at step S106 is read out (step S110) and is reduced to thumbnail-image data of a prescribed size by the reducing circuit 39 (step S111). Next, at step S112, the thumbnail-image data is subjected to JPEG compression encoding processing by the compression/expansion circuit 29. The image data that has undergone compressing encoding processing in accordance with the JPEG scheme is temporarily retained in RAM 30 again as a compressed image (B) (step S113).

Finally, the compressed image (A) that has undergone JPEG-2000 compressing encoding processing and the compressed image (B) (the thumbnail image) that has undergone JPEG compressing encoding processing are retained in the recording medium 32 as one file. Accordingly, first a file for holding the images is created at step S114 and the header of the image file is created at step S115 and written to the file. Next, at step S116, the thumbnail image [compressed image (B)], which was subjected to JPEG compressing encoding processing and retained temporarily in RAM 30 at step S113, is written to the file. Next, at step S117, the compressed image (A), which was subjected to JPEG-2000 compressing encoding processing and retained temporarily in RAM 30 at step S109, is written to the file. Finally, at step S118, the file is closed to complete the photographic operation.

Figure 4:
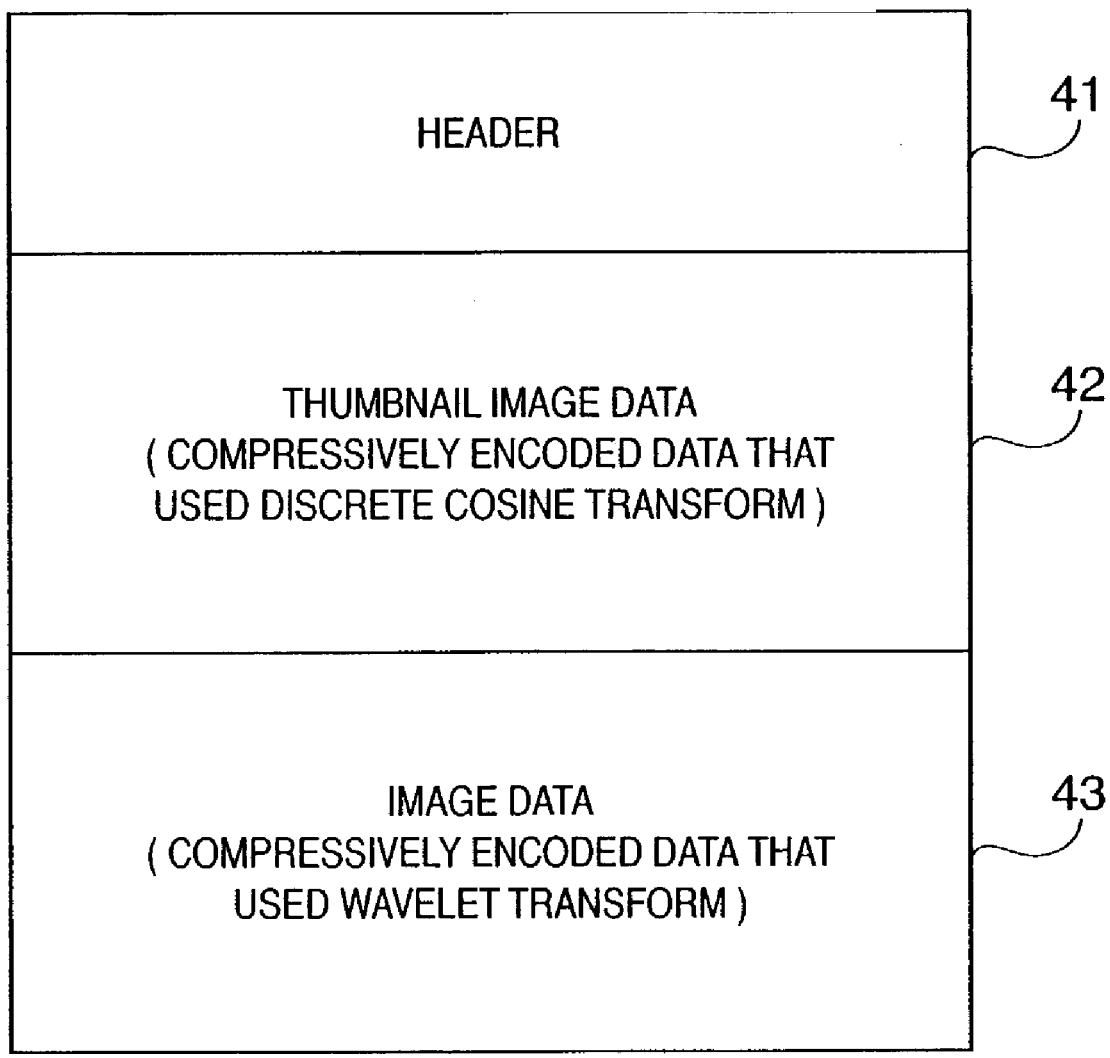
FIG. 4 is a diagram illustrating an example of the structure of an image file generated in the processing of FIG. 3.

FIG. 4 is a diagram illustrating an example of the structure of the generated file. A file 40 is composed of a header 41, thumbnail-image data area 42 and an image data area 43. Data of a reduced image that has been compressively encoded using a discrete cosine transform is stored in the thumbnail-image data area 42, and original image data that has been compressively encoded using a wavelet transform is stored in the image data area 43.

Information necessary for decoding, which includes the fact that image data of two images is contained in the file 40 as well as information regarding the size of each image, the method of encoding and the starting location in the file, has been written to the header 41. By virtue of the header 41, a device that can expand encoded image data which employed a discrete cosine transform but that cannot expand encoded image data which employed a wavelet transform is capable of expanding the thumbnail-image data area 42, which is contained in the file 40, and is capable of checking the content thereof.

In accordance with DCF, which is a standard currently being used widely as an image file format for digital cameras, it is possible for a thumbnail image in the JPEG format to be stored separately in the same file as the main image (the image that has been sensed). At the present time, RGB non-compressed data, YCbCr non-compressed data and JPEG compressed data are stipulated as formats of the main image in DCF. In the future, however, by recording image data in the JPEG format as a thumbnail image as in this embodiment, even a device that supports the present DCF standard will be capable of checking image content by analyzing the header and expanding the thumbnail image even in a case where compressed data in a compression format (e.g., the JPEG 2000 format) using the wavelet transform has been recorded as the main image.

(Image Display Processing)

Figure 5:
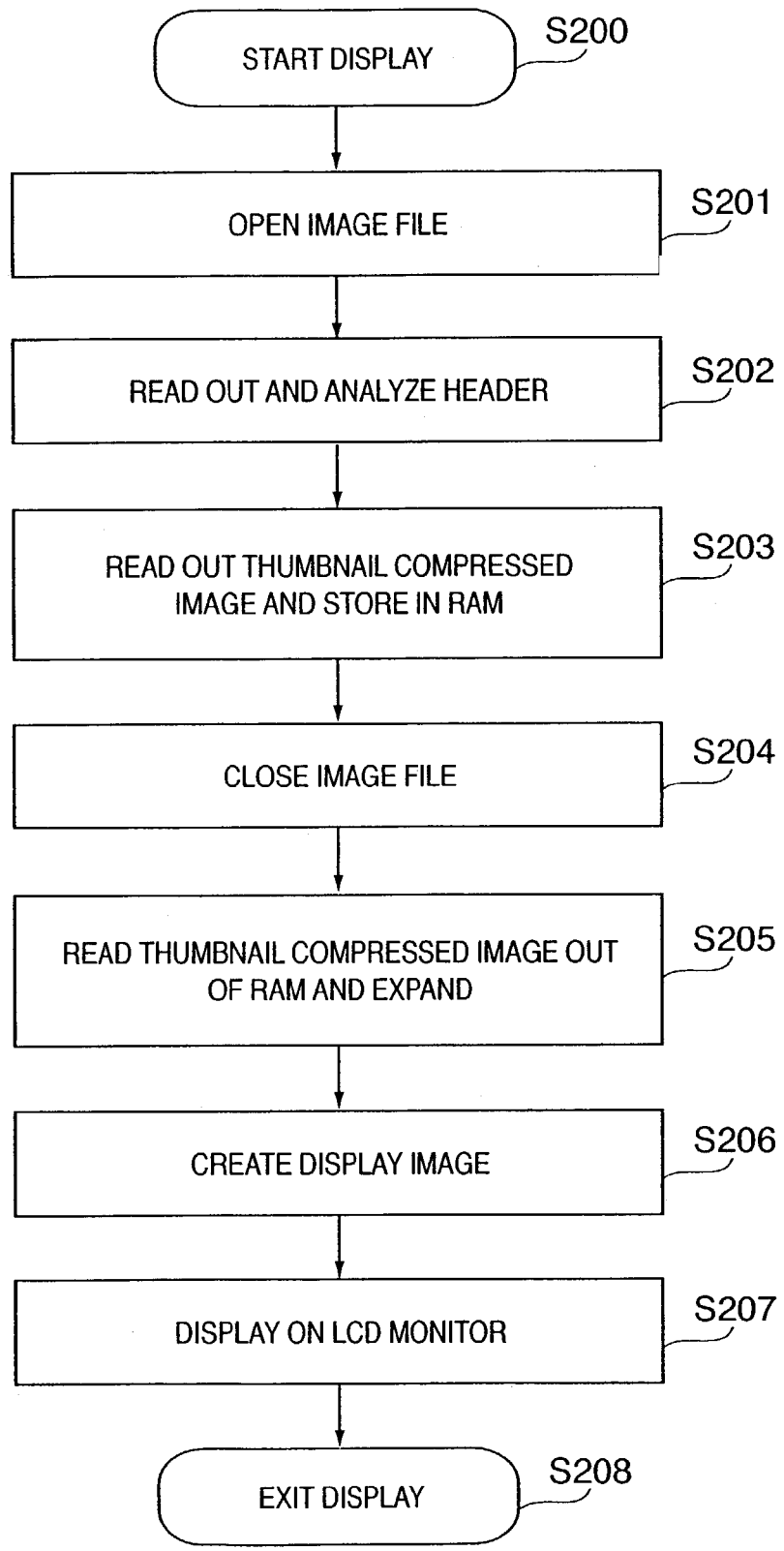
FIG. 5 is a flowchart useful in describing display processing in the digital camera of FIG. 2.

Next, reference will be had to the flowchart shown in FIG. 5 to described image display processing in the digital camera to which the present invention shown in FIG. 2 is applied.

In the description below, it will be assumed that when the digital camera is used to check the content of a captured image (an image recorded on the recording medium 32), the camera displays not the image data actually captured but a thumbnail image obtained by reducing the captured image data, the reason being to shorten processing time, etc.

The user causes the digital camera to start image display processing by applying, e.g., an image display command via the control panel 45 (step S200). First, at step S201, an image file that has been recorded on the recording medium 32 is opened. If a plurality of image files exist on the recording medium 32 at this-time, which file is to be opened is changed at will by a predetermined setting. Specifically, files are opened in order of decreasing age or the file that follows the file opened last is opened, etc.

When a file is opened, the header 41 is read out and analyzed at step S202. It can thus be determined whether the image file contains a thumbnail image that has been compressively encoded in accordance with the JPEG scheme. Next, at step S203, the position at which the thumbnail image, which has undergone JPEG compressing encoding processing, is retained in the image file is acquired from the header 401, the thumbnail image data is read out of the thumbnail-image data area 42 and is retained in RAM 30 temporarily.

Next, the image file is closed at step S204 and the thumbnail compressed image, which has been retained temporarily in RAM 30, is read out and the thumbnail compressed image is expanded by the compression/expansion circuit 29 at step S205. A display image is then created at step S206 and the image is displayed on the liquid crystal monitor 34 at step S207, thereby completing the operation for displaying the thumbnail image. In a case where images that have been recorded on the recording medium 32 are plural in number, display processing is repeated in accordance with a command from the user. An arrangement may be adopted in which, depending upon the setting, a prescribed plurality of thumbnail images are displayed in list form.

According to this embodiment, both original and thumbnail images are compressively encoded when an image is compressively encoded. As a result, when a display is presented, it is unnecessary to generate a thumbnail image by reading out and expanding image data that has been obtained by compressively encoding the original image. This makes it possible to shorten processing time.

Furthermore, by using a compressing encoding method, which uses a discrete cosine transform, such as the JPEG method as the method of encoding a thumbnail image, processing time necessary for displaying the thumbnail image can be shortened further. That is, in general, compressively encoded file size of a thumbnail image based upon an encoding method that uses a discrete cosine transform is sufficiently small in comparison with the original-image file size based upon a compressing encoding method using a wavelet transform, and therefore less time suffices for reading the image data out of the recording medium. In addition, generally speaking, processing time for expanding encoded data compressively encoded using a discrete cosine transform is short in comparison with processing time for expanding encoded data compressively encoded using a wavelet transform and therefore display processing time can be shortened even further.

Further, in accordance with the image encoding apparatus according to the present invention, a thumbnail image is compressively encoded by an encoding method that uses a discrete cosine transform, and the image is incorporated in the same file as that of the original image data compressively encoded using a wavelet transform. As a result, even a device that cannot expand data that has been compressively encoded using the wavelet transform can check the content of the image data if the device is capable of expanding data that has been compressively encoded utilizing the more commonly used discrete cosine transform.

OTHER EMBODIMENTS

In the above-described embodiment, only a thumbnail image is incorporated in an image file upon being compressively encoded by an encoding method using a discrete cosine transform. However, an image having a larger size can also be incorporated in an image file in the same manner upon compressively encoding it by an encoding method using a discrete cosine transform. As a result, in a case where a large image display is required, as in a mode for displaying a captured image using the full screen of the liquid crystal monitor, using for display purposes image data that has been compressively encoded by an encoding method employing a discrete cosine transform makes it possible to shorten processing time as compared with an instance where image data compressively encoded using a wavelet transform is expanded and displayed.

Of course, any number of items of image data can be incorporated in one image file and it is possible to incorporate a larger number of items of image data depending upon use.

Further, in the foregoing embodiment, there is described only a case where the image display apparatus senses, expands and displays compressed image data, which has been compressively encoded using a discrete cosine transform, from an image file containing compressed image data compressively encoded using a wavelet transform and the compressed image data compressively encoded using the discrete cosine transform. However, it goes without saying that an image file that is to be displayed may include compressed image data that has been encoded by a compressing encoding method other than a compressing encoding method using a wavelet transform.

Furthermore, information relating to compressed image data contained in an image file may be written not only in the header but also in the compressed image data, e.g., at the beginning of the compressed image data. In such case it would be possible for the header to store only the starting position of each compressed image. In other words, the structure of the image file and information other than the compressed image data stored in the image file can be set at will in conformity with the apparatus that expands and displays the image data.

Further, it goes without saying that although the digital camera shown in FIG. 2 does not possess an expansion circuit that uses a wavelet transform, the camera may be provided with an expansion circuit.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiment are implemented by executing the program codes read by a computer, it goes without saying that the present invention covers a case where an operating system (OS) or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

In a case where the present invention is applied to the above-mentioned storage medium, program codes corresponding to the flowcharts (FIG. 3 and/or FIG. 5) described earlier would be stored on the storage medium.

Thus, in accordance with the present invention, as described above, when an image file obtained by compressively encoding image data is formed, a compressively encoded file that used a wavelet transform and a compressively encoded file that used a discrete cosine transform are incorporated in a single image file. As a result, even a device incapable of expanding compressively-encoded data that used a wavelet transform can check the content of image data if the device is capable of expanding compressively encoded data that used a discrete cosine transform.

The invention claimed is:

1. An image encoding apparatus for generating an image file having compressed image data obtained by compressively encoding image data, comprising:
   first encoding means for compressively encoding input image data by a compressing encoding method that uses a wavelet transform, and outputting the result as first compressed image data;
   second encoding means for compressively encoding the input image data by a compressing encoding method that uses a discrete cosine transform, and outputting the result as second compressed image data; and
   image file generating means for generating a single image file, representing the input image data, by using the first and second compressed image data and information relating to the first and second compressed image data,
   wherein the compressive encodings of said first and second encoding means are performed in parallel and separately.

2. An image encoding apparatus according to claim 1, wherein said second encoding means has image reducing means for reducing the input image data to a predetermined size and applies the compressing encoding method that uses the discrete cosine transform to the input image data of which size has been reduced.

3. An image encoding apparatus according to claim 1, wherein the information relating to the first and second compressed image data includes at least one of sites of the first and second compressed image data, the compressing encoding method and starting positions in the image file.

4. An image encoding apparatus according to claim 1, wherein said second encoding means has image reducing means for reducing the input image data to a plurality of predetermined sizes that differ from each other and applies the compressing encoding method that uses the discrete cosine transform to each of the plurality of input image data of reduced size and outputs a plurality of the second compressed image data; and
   said image file generating means generates the image file using the first compressed image data, the plurality of second compressed image data and information ion relating to the first compressed image data and the plurality of second compressed image data.

5. An image encoding apparatus according to claim 1, further comprising storage means for storing the image file.

6. An image encoding apparatus according to claim 5, wherein said storage means is removable.

7. An image display apparatus comprising:
   extraction means for extracting first compressed image data, which has been compressively encoded by a compressing encoding method using a discrete cosine transform, from an image file containing plural items of compressed image data encoded by compressing encoding methods that differ from one another;
   expansion means for expanding the extracted first compressed image data using an inverse discrete cosine transform;
   display-image generating means for generating image data for display by using image data obtained as a result of said expansion; and
   display means for displaying the image data for display,
   wherein the image file contains the first compressed image data and second compressed image data, and wherein the first compressed image data has been compressed by using a discrete cosine transform and without using a wavelet transform, and the second compressed image data has been compressed by using the wavelet transform and without using the discrete cosine transform.

8. An image processing system comprising:
   an image encoding apparatus for generating an image file having compressed image data obtained by compressively encoding image data, comprising:
      first encoding means for compressively encoding input image data by a compressing encoding method that uses a wavelet transform, and outputting the result as first compressed image data;

second encoding means for compressively encoding the input image data by a compressing encoding method that uses a discrete cosine transform, and outputting the result as second compressed image data; and image file generating means for generating a single image file, representing the input image data, by using the first and second compressed image data and information relating to the first and second compressed image data, and an image display apparatus, comprising:

extraction means for extracting compressed image data, which has been compressively encoded by a compressing encoding method using a discrete cosine transform, from the image file containing plural items of compressed image data encoded by compressing encoding methods that differ from one another;

expansion means for expanding the extracted compressively encoded image data using an inverse discrete cosine transform;

display-image generating means for generating image data for display by using image data obtained as a result of said expansion; and display means for displaying the image data for display, wherein the compressive encodings of said first and second encoding means are performed parallel and separately.

9. An image sensing apparatus comprising:

an image encoding apparatus for generating an image file having compressed image data obtained by compressively encoding image data, comprising:

first encoding means for compressively encoding input image data by a compressing encoding method that uses a wavelet transform, and outputting the result as first compressed image data;

second encoding means for compressively encoding the input image data by a compressing encoding method that uses a discrete cosine transform, and outputting the result as second compressed image data; and image file generating arenas for generating a single image file, representing the input image data, by using the first and second compressed image data and information relating to the first and second compressed image data, and an image display apparatus comprising:

extraction means for extracting compressed image data, which has been compressively encoded by a compressing encoding method using a discrete which has been compressively encoded by a compressing encoding method using a discrete cosine transform, from the image file containing plural items of compressed image data encoded by compressing encoding methods that differ from one another;

expansion means for expanding the extracted compressively encoded image data using an inverse discrete cosine transform;

display-image generating means for generating image data for display by using image data obtained as a result of said expansion; and display means for displaying the image data for display, wherein the compressive encodings of said first and second encoding means are performed in parallel and separately.

10. An image encoding method for generating an image file having compressed image data obtained by compressively encoding image data, said method comprising:

a first encoding step, of compressively encoding input image data by a compressing encoding method that uses a wavelet transform, and outputting the result as first compressed image data;

a second encoding step, of compressively encoding the input image data by a compressing encoding method that uses a discrete cosine transform, and outputting the result as second compressed image data; and an image file generating step, of generating a single image file, representing the input image data, by using the first and second compressed image data and information relating to the first and second compressed image data, wherein the compressive encodings of said first and second encoding steps are performed in parallel and separately.

11. An image encoding method according to claim 10, wherein said second encoding step has an image reducing step of reducing the input image data to a predetermined size and applies the compressing encoding method that uses the discrete cosine transform to the input image data of which size has been reduced.

12. An image encoding method according to claim 10, wherein the information relating to the first and second compressed image data includes at least one of sizes of the first and second compressed image data, the compressing encoding method and starting positions in the image file.

13. An image encoding method according to claim 10, wherein said second encoding step has an image reducing step of reducing the input image data to a plurality of predetermined sizes that differ from one another and subjects each of the plurality of input image data of reduced size to the compressing encoding method that uses a discrete cosine transform and outputs a plurality of the second compressed image data; and said image file generating step includes generating the image file using the first compressed image data, the plurality of second compressed image data and information relating to the first compressed image data and the plurality of second compressed image data.

14. An image encoding method according to claim 10, further comprising a storage step, of storing the image file.

15. An image display method comprising:

an extraction step, of extracting first compressed image data, which has been compressively encoded by a compressing encoding method using a discrete cosine transform, from an image file containing plural items of compressed image data encoded by compressing encoding methods that differ from one another;

an expansion step, of expanding the extracted first compressed image data using an inverse discrete cosine transform;

a display-image generating step, of generating image data for display by using image data obtained as a result of said expansion; and a display step, of displaying the image data for display, wherein the image file contains the first compressed image data and second compressed image data, and wherein the first compressed image data has been compressed by using a discrete cosine transform and without using a wavelet transform, and the second compressed image data has been compressed by using the wavelet transform and without using the discrete cosine transform.

16. A computer-readable storage medium storing an image encoding program for generating an image file having compressed image data obtained by compressively encoding image data, said program comprising:

program code of a first encoding step, of compressively encoding input image data by a compressing encoding method that uses a wavelet transform, and outputting the result as first compressed image data;

program code of a second encoding step, of compressively encoding the input image data by a compressing encoding method that uses a discrete cosine transform, and outputting the result as second compressed image data; and program code of an image file generating step, of generating a single image file, representing the input image data, by using the first and second compressed image data and information relating to the first and second compressed image data, wherein said compressive encodings of said first and second encoding steps are performed in parallel and separately.

17. The storage medium according to claim 16, wherein the program code of said second encoding step has program code of an image reducing step, of reducing the input image data to a plurality of predetermined sizes that differ from one another and subjects each of the plurality of input image data of reduced size to the compressing encoding method that uses a discrete cosine transform and outputs a plurality of the second compressed image data; and the program code of said image file generating step generates the image file using the first compressed image data, the plurality of second compressed image data and information relating to the first compressed image data and the plurality of second compressed image data.

18. A computer-readable storage medium storing a program of an image display method, comprising:

program code of an extraction step, of extracting first compressed image data, which has been compressively encoded by a compressing encoding method using a discrete cosine transform, from an image file containing plural items of compressed image data encoded by compressing encoding methods that differ from one another;

program code of an expansion step, of expanding the extracted first compressed image data using an inverse discrete cosine transform;

program code of a display-image generating step, of generating image data for display by using image data obtained as a result of said expansion; and program code of a display step, of displaying the image data for display, wherein the image file contains the first compressed image data and second compressed image data, and wherein the first compressed image data has been compressed by using a discrete cosine transform and without using a wavelet transform, and the second compressed image data has been compressed by using the wavelet transform and without using the discrete cosine transform.

19. An image sensing apparatus comprising:

an image encoding apparatus for generating an image file having compressed image data obtained by compressively encoding image data, comprising:

first encoding means for compressively encoding input image data by a compressing encoding method that uses a wavelet transform, and outputting the result as first compressed image data;

second encoding means for compressively encoding the input image data by a compressing encoding method that uses a discrete cosine transform, and outputting the result as second compressed image data; and image file generating means for generating a single image file, representing the input image data, by using the first and second compressed image data and information relating to the first and second compressed image data, wherein said compressive encodings of said first and second encoding means are performed in parallel and separately.

20. An image sensing apparatus comprising:

an image display apparatus comprising:

extraction means for extracting first compressed image data, which has been compressively encoded by a compressing encoding method using a discrete cosine transform, from an image file containing plural items of compressed image data encoded by compressing encoding methods that differ from one another;

expansion means for expanding the extracted first compressed image data using an inverse discrete cosine transform;

display-image generating means for generating image data for display by using image data obtained as a result of said expansion; and display means for displaying the image data for display, wherein the image file contains the first compressed image data and second compressed image data, and wherein the first compressed image data has been compressed by using a discrete cosine transform and without using a wavelet transform, and the second compressed image data has been compressed by using the wavelet transform and without using the discrete cosine transform.

21. An image encoding apparatus for generating an image file having compressed image data obtained by compressively enclosing image data, comprising:

first encoding means for compressively encoding input image data by a compressing encoding method that uses a wavelet transform, and outputting the result as first compressed image data;

second encoding means for compressively encoding the input image data by a compressing encoding method that uses a discrete cosine transform, and outputting the result as second compressed image data; and image file generating means for generating a single image file, representing the input image data, by using the first and second compressed image data and information relating to the first and second compressed image data, wherein the first compressed image data is compressed without using a discrete cosine transform and the second compressed image data is compressed without using a wavelet transform.

22. An image encoding method for generating an image file having compressed image data obtained by compressively encoding image data, said method comprising:

a first encoding step, of compressively encoding input image data by a compressing encoding method that uses a wavelet transform, and outputting the result as first compressed image data;

a second encoding step, of compressively encoding the input image data by a compressing encoding method that uses a discrete cosine transform, and outputting the result as second compressed image data; and an image file generating step, of generating a single image file, representing the input image data, by using the first and second compressed image data and information relating to the first and second compressed image data, wherein the first compressed image data is compressed without using a discrete cosine transform and the second compressed image data is compressed without using a wavelet transform.

23. A computer readable storage medium storing an image encoding program for generating an image file having compressed image data obtained by compressively encoding image data, wherein said program comprises:

program code of a first encoding step, of compressively encoding input image data by a compressing encoding method that uses a wavelet transform, and outputting the result as first compressed image data;

program code of a second encoding step, of compressively encoding the input image data by a compressing encoding method that uses a discrete cosine transform, and outputting the result as second compressed image data; and program code of an image file generating step, of generating a single image file, representing the input image data, by using the first and second compressed image data and information relating to the first and second compressed image data, wherein the first compressed image data is compressed without using a discrete cosine transform and the second compressed image data is compressed without using a wavelet transform.

* * * * *

UNITED STATES PATENT AND TRADEMARK OFFICE
CERTIFICATE OF CORRECTION

| | |
|---|---|
| PATENT NO. | : 7,079,696 B2 |
| APPLICATION NO. | : 10/327184 |
| DATED | : July 18, 2006 |
| INVENTOR(S) | : Yuji Koide |

It is certified that error appears in the above-identified patent and that said Letters Patent is hereby corrected as shown below:

SHEET 3

FIG. 3, "OUR OF" (two occurrences) should read --OUT OF--.

COLUMN 7

Line 23, "described" should read --describe--; and
Line 36, "this-time," should read --this time,--.

COLUMN 9

Line 55, "compressively-encoded" should read --compressively encoded--.

COLUMN 10

Line 20, "sites" should read --sizes--; and
Line 33, "ion" should be deleted.

COLUMN 11

Line 29, "parallel" should read --in parallel--;
Line 44, "areans" should read --means--;
Line 52, "which has" should be deleted;
Line 53, line 53 should be deleted; and
Line 54, "encoding method using a discrete" should be deleted.

Signed and Sealed this

Tenth Day of July, 2007

JON W. DUDAS
*Director of the United States Patent and Trademark Office*